(12) United States Patent
Zhan

(10) Patent No.: US 7,812,256 B2
(45) Date of Patent: Oct. 12, 2010

(54) HOUSING ASSEMBLY FOR ELECTRONIC DEVICE

(75) Inventor: Wen-Zhong Zhan, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 266 days.

(21) Appl. No.: 12/194,618

(22) Filed: Aug. 20, 2008

(65) Prior Publication Data

US 2009/0296327 A1    Dec. 3, 2009

(30) Foreign Application Priority Data

May 30, 2008    (CN) .......................... 2008 1 0301860

(51) Int. Cl.
*H02G 3/14* (2006.01)
(52) U.S. Cl. .......................... 174/50; 174/520; 174/559; 361/752; 361/800; 455/575.1
(58) Field of Classification Search ................... 174/50, 174/520, 559; 361/679, 752, 818, 728, 747, 361/800; 455/575.1
See application file for complete search history.

(56) References Cited

U.S. PATENT DOCUMENTS

| 5,955,700 | A  | * | 9/1999 | Slipy et al. ..................... 174/50 |
| 7,235,738 | B2 | * | 6/2007 | Horinouchi et al. ........... 174/50 |
| 7,414,855 | B1 | * | 8/2008 | Arnold ........................ 361/752 |
| 7,667,956 | B2 | * | 2/2010 | Chien ..................... 361/679.21 |

* cited by examiner

*Primary Examiner*—Dhiru R Patel
(74) *Attorney, Agent, or Firm*—Steven M. Reiss

(57) ABSTRACT

A housing assembly (10) for use in a portable electronic device, includes base (14) and a decorative element (12). The base (14) has a securing portion (144) protruding therefrom; The decorative element (12) has a securing groove (126) corresponding to the securing portion (144) and the cross-sectional area of the securing groove (126) being smaller than the cross-sectional area of the securing portion (144); When the decorative element (12) is pressed toward the base (14), the decorative element (12) may be elastically deformed due to the pressing force, and the cross-sectional area of the securing groove (126) is enlarged so the securing portion (144) can be pushed in the securing groove (126); and when the pressing force is removed, the securing groove (126) begins trying to shrink to its original state so that the securing portion (144) is press-fit within the securing groove (126) to mount the decorative element (12) on the base (14).

8 Claims, 2 Drawing Sheets

HOUSING ASSEMBLY FOR ELECTRONIC DEVICE

BACKGROUND

1. Field of the Invention

The present invention relates to housing assemblies, particularly to housing assemblies used in portable electronic devices.

2. Description of Related Art

With the development of wireless communication and information processing technology, portable electronic devices, such as mobile telephones and electronic notebooks are now in widespread use. External appearance of the housing of the portable electronic device is one of the key factors for attracting consumers.

A typical way to achieve an attractive external appearance is attaching (e.g., bonding or welding) a decorative element to the housing. However, attaching a decorative element to the housing may damage the housing and increase the manufacturing cost.

Therefore, there is room for improvement within the art.

BRIEF DESCRIPTION OF THE DRAWINGS

Many aspects of the exemplary housing assembly can be better understood with reference to the following drawings. These drawings are not necessarily drawn to scale, the emphasis instead being placed upon clearly illustrating the principles of the present housing assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Exemplary embodiments will now be described in detail below and with reference to the drawings.

Figure 1:
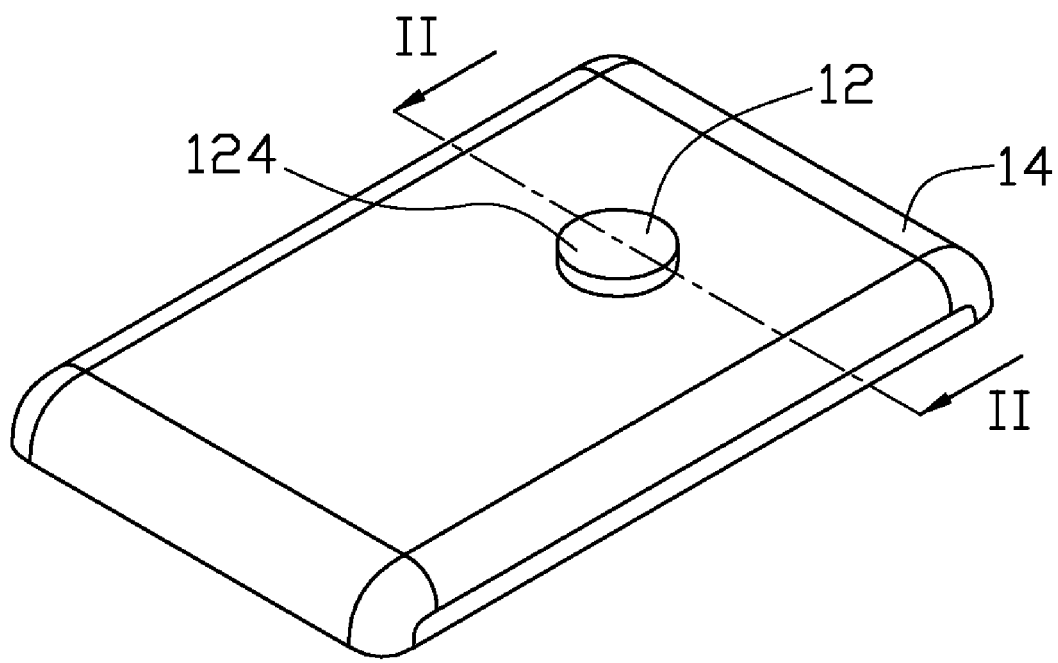
FIG. 1 is an isometric view of a housing assembly in accordance with an exemplary embodiment.

Referring to FIG. 1, the exemplary housing assembly 10 is suitably used in a portable electronic device (details not shown), such as a mobile phone, a digital camera, and so on. The housing assembly 10 includes a base 14 and a decorative element 12 mounted on the base 14.

Figure 2:
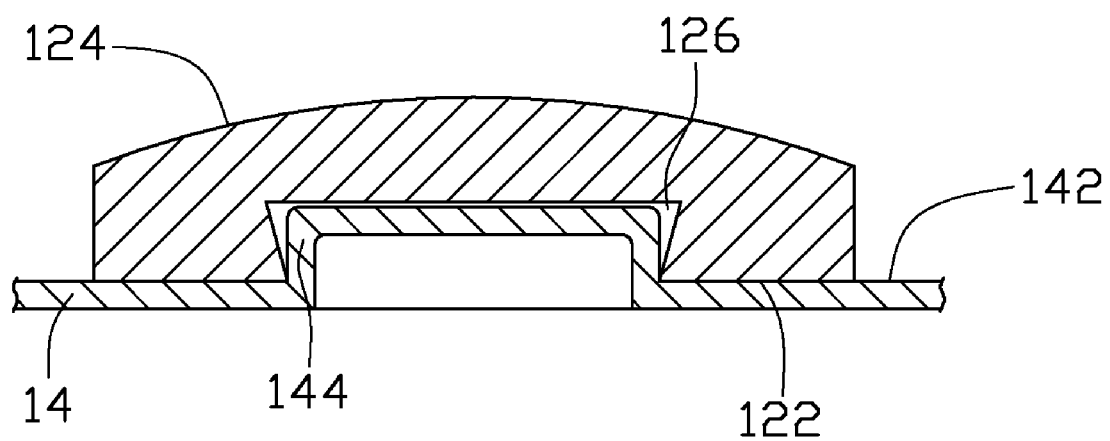
FIG. 2 is a section view of a portion of the housing assembly shown in FIG. 1.

Referring to FIG. 2, the decorative element 12 has a first surface 122 facing the base 14 and an opposite second surface 124. The decorative element 12 has a securing groove 126 defined in the first surface 122. The cross sectional area of the securing groove 126 gradually increases from the end nearest the first surface 122 to the other end of securing groove 126, adjacent to the second surface 124.

The decorative element 12 may be made of plastic or metal. When the decorative element 12 is made of plastic, the decorative element 12 it can be further processed by a surface treatment, such as plating. The plastic may be made of one or more thermoplastic resins selected from a group consisting of PVC (polyvinyl chloride), polycarbonate and polystyrene. The metal may be selected from the group of copper, magnesium, and chromite.

The base 14 has a base surface 142 facing the decorative element 12 and has a securing portion 144 protruding from the base surface 142. The securing portion 144 corresponds to the securing groove 126 and has a cross-sectional area larger than the cross-sectional area of the end of securing groove 126 adjacent to the first surface 122.

In assembly, firstly the securing groove 126 is aligned with the securing portion 144. Then, the decorative element 12 is pressed toward the base 14 so that the decorative element 12 may be elastically deformed and have its cross-sectional area increased by the pressing force and larger cross-sectional area of securing portion 144. Secondly, the pressing force is released and the securing groove 126 begins to try and shrink original cross-section. This results in, the securing portion 144 being press fit and engaged with the securing groove 126 to mount the decorative element 12 of the base 14

One of the main advantages of the present embodiment is that the decorative element 12 can be mounted to the base 14 by the engagement between the securing portion 144 and the securing groove 126, thereby improving the quality of the housing, and the cost of making the housing is low.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing assembly for use in a portable electronic device, comprising:
   a base having a securing portion protruding therefrom;
   a decorative element having a securing groove corresponding to the securing portion and a cross-sectional area of the securing groove being smaller than a cross-sectional area of the securing portion;
   whereby when the decorative element is pressed toward the base, the decorative element may be elastically deformed due to the pressing force, and the cross-sectional area of the securing groove enlarges so the securing portion can being pushed in the securing groove; and when the pressing force is removed, the securing groove begins trying to shrink to its original state so that the securing portion is press-fit within the securing groove to mount the decorative element on the base.

2. The housing assembly as claimed in claim 1, wherein the decorative element has a first surface defining the securing groove.

3. The housing assembly as claimed in claim 2, wherein the decorative element has a second surface located opposite to the first surface, the cross sectional area of the securing groove enlarges from its end adjacent to the first surface to the other end opposite end of the securing groove adjacent to the second surface.

4. The housing assembly as claimed in claim 3, wherein the securing portion has the same shape as the securing groove with the cross-sectional area larger than the end of securing groove to the first surface.

5. The housing assembly as claimed in claim 1, wherein the base has a base surface facing the decorative element the securing portion protruding from the securing surface.

6. The housing assembly as claimed in claim 1, wherein the decorative element can be made of plastic or metal.

7. The housing assembly as claimed in claim 6, wherein the plastic is one or more thermoplastic resins selected from a group consisting of PVC (polyvinyl chloride), polycarbonate and polystyrene.

8. The housing assembly as claimed in claim 6, wherein the metal is one or more metals selected from a group consisting of copper, magnesium, and chromite.

* * * * *